(12) United States Patent
Drugge et al.

(10) Patent No.: US 10,701,643 B2
(45) Date of Patent: Jun. 30, 2020

(54) MAXIMUM COMMUNICATION DISTANCE RANGE ADAPTATION

(71) Applicant: Telefonaktiebolaget LM Ericsson (publ), Stockholm (SE)

(72) Inventors: Oskar Drugge, Hjärup (SE); Peter Alriksson, Hörby (SE); Emma Wittenmark, Lund (SE); David Sugirtharaj, Lund (SE); Yusheng Liu, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/477,849

(22) PCT Filed: Dec. 19, 2017

(86) PCT No.: PCT/EP2017/083593
§ 371 (c)(1),
(2) Date: Jul. 12, 2019

(87) PCT Pub. No.: WO2018/141457
PCT Pub. Date: Aug. 9, 2018

(65) Prior Publication Data
US 2020/0128491 A1    Apr. 23, 2020

Related U.S. Application Data

(60) Provisional application No. 62/454,145, filed on Feb. 3, 2017.

(51) Int. Cl.
*H04W 52/28* (2009.01)
*H04W 52/14* (2009.01)
(Continued)

(52) U.S. Cl.
CPC ........ *H04W 52/283* (2013.01); *H04W 16/26* (2013.01); *H04W 52/143* (2013.01);
(Continued)

(58) Field of Classification Search
CPC .............. H04W 52/283; H04W 52/50; H04W 52/0206; H04W 52/0229; H04W 64/00;
(Continued)

(56) References Cited

U.S. PATENT DOCUMENTS 9,629,039 B2 * 4/2017 Capdevielle .......... H04W 16/32
2010/0142448 A1    6/2010 Schlicht et al.
(Continued)

FOREIGN PATENT DOCUMENTS

CN    103052131 A    4/2013
CN    105120502 A    12/2015
(Continued)

OTHER PUBLICATIONS

Author Unknown, "Technical Specification Group Radio Access Network; Study on provision of low-cost Machine-Type Communications (MTC) User Equipments (UEs) based on LTE (Release 12)," Technical Report 36.888, Version 12.0.0, 3GPP Organizational Partners, Jun. 2013, 55 pages.
(Continued)

*Primary Examiner* — Shaima Q Aminzay
(74) *Attorney, Agent, or Firm* — Withrow & Terranova, PLLC

(57) ABSTRACT

A method for a network node of a wireless communication network is disclosed. The network node is adapted to communicate with wireless communication devices of a first type associated with a first maximum communication distance range and with wireless communication devices of a second type associated with a second maximum communication distance range, the first maximum communication
(Continued)

distance range being greater than second maximum communication distance range.

20 Claims, 4 Drawing Sheets

(51) Int. Cl.
*H04W 52/36* (2009.01)
*H04W 16/26* (2009.01)
*H04W 52/34* (2009.01)

(52) U.S. Cl.
CPC ....... *H04W 52/146* (2013.01); *H04W 52/343* (2013.01); *H04W 52/346* (2013.01); *H04W 52/367* (2013.01)

(58) Field of Classification Search
CPC . H04W 52/245; H04W 52/36; H04W 64/003; H04W 52/343; H04W 52/143; H04W 16/26; H04W 52/146; H04W 52/367; H04W 52/346
USPC ......................................................... 455/522
See application file for complete search history.

(56) References Cited

U.S. PATENT DOCUMENTS

2013/0271288 A1  10/2013  Liang et al.
2014/0099962 A1*  4/2014  Capdevielle .......... H04W 16/32
                                                            455/441

FOREIGN PATENT DOCUMENTS

CN      105813209 A    7/2016
EP      2528371 A1     11/2012
WO      2014127101 A2  8/2014
WO      2016209311 A1  12/2016

OTHER PUBLICATIONS

Author Unknown, "Technical Specification Group Radio Access Network; Evolved Universal Terrestrial Radio Access (E-UTRA); User Equipment (UE) radio transmission and reception (Release 14)," Technical Specification 36.101, Version 14.2.1, 3GPP Organizational Partners, Jan. 2017, 1262 pages.

Author Unknown, "Technical Specification Group Radio Access Network; Evolved Universal Terrestrial Radio Access (E-UTRA); Physical channels and modulation (Release 12)," Technical Specification 36.211, Version 12.3.0, 3GPP Organizational Partners, Sep. 2014, 124 pages.

Author Unknown, "Technical Specification Group Radio Access Network; Evolved Universal Terrestrial Radio Access (E-UTRA); Multiplexing and channel coding (Release 12)," Technical Specification 36.212, Version 12.6.0, 3GPP Organizational Partners, Sep. 2015, 95 pages.

Author Unknown, "Technical Specification Group Radio Access Network; Evolved Universal Terrestrial Radio Access (E-UTRA); Physical layer procedures (Release 12)," Technical Specification 36.213, Version 12.3.0, 3GPP Organizational Partners, Sep. 2014, 212 pages.

Author Unknown, "Technical Specification Group Radio Access Network; Evolved Universal Terrestrial Radio Access (E-UTRA); Medium Access Control (MAC) protocol specification (Release 12)," Technical Specification 36.321, Version 12.1.0, 3GPP Organizational Partners, Mar. 2014, 57 pages.

Author Unknown, "Wideband transmission systems; Data transmission equipment operating in the 2,4 GHz ISM band and using wide band modulation techniques; Harmonised Standard covering the essential requirements of article 3.2 of Directive 2014/53/EU," European Telecommunications Standards Institute (ETSI), Harmonised European Standard EN 300 328, Version 2.1.1, Nov. 2016, 101 pages.

International Search Report and Written Opinion for International Patent Application No. PCT/EP2017/083593, dated Mar. 1, 2018, 8 pages.

* cited by examiner

MAXIMUM COMMUNICATION DISTANCE RANGE ADAPTATION

This application is a 35 U.S.C. § 371 national phase filing of International Application No. PCT/EP2017/083593, filed Dec. 19, 2017, which claims the benefit of U.S. Provisional Application No. 62/454,145, filed Feb. 3, 2017, the disclosures of which are incorporated herein by reference in their entireties.

TECHNICAL FIELD

The present disclosure relates generally to the field of wireless communication. More particularly, it relates to adaptation of the maximum communication distance range of a network node for wireless communication.

BACKGROUND

Unlicensed spectrum may be used as a complement to the licensed spectrum and/or may allow completely standalone operation.

Ongoing work in 3GPP Third Generation Partnership Program (3GPP) relates to "Licensed-Assisted Access" (LAA) and intends to allow UMTS-LTE (Universal Mobile Telecommunication System, Long Term Evolution; hereinafter "LTE") compliant equipment to also operate in frequency ranges (bands) denoted as unlicensed radio spectrum. LTE in unlicensed spectrum may be denoted LTE-U. When the unlicensed spectrum is used as a complement to the licensed spectrum, devices typically connect in the licensed spectrum (to a primary cell or PCell) and use carrier aggregation to benefit from additional transmission capacity in the unlicensed spectrum (to a secondary cell or SCell). A typical carrier aggregation (CA) framework allows aggregation of two or more carriers with the condition that at least one of the carriers (or frequency channels) is in the licensed spectrum and at least one of the carriers is in the unlicensed spectrum. Further evolution of the LAA feature (which only supports downlink (DL) traffic) has been specified in terms of enhanced License Assisted Access (eLAA), which includes the possibility to also schedule uplink (UL) traffic on the secondary carriers (in the unlicensed bands). Candidate bands for LTE operation in the unlicensed spectrum include the 5 GHz band, the 3.5 GHz band, etc.

In a typical standalone (or completely unlicensed spectrum) mode of operation, one or more carriers, all of which are in the unlicensed spectrum, are used. In parallel to the work within 3GPP, the MulteFire Alliance (MFA) also has ongoing work to standardize a system that allows the use of standalone primary carriers within unlicensed spectrum. The resulting MulteFire 1.0 standard supports both UL and DL traffic.

Traditionally, the unlicensed 5 GHz spectrum is mainly used by equipment implementing the IEEE 802.11 Wireless Local Area Network (WLAN) standard. This standard is known under its marketing brand "Wi-Fi" and allows completely standalone operation in the unlicensed spectrum.

Internet of Things (IoT) can be considered a fast evolving market within the telecommunications realm, and 3GPP standards currently offer some different variants supporting IoT services (e.g. eMTC: enhanced machine type communication, NB-IoT: narrow band IoT, and EC-GSM: extended coverage GSM (Global System for Mobile communication)). Some use cases, e.g. where outdoor macro eNodeBs communicate with IoT devices deep inside buildings, may require standardized coverage enhancement mechanisms (an example of increased maximum communication distance range). Some possible features/requirements of IoT devices include power saving mode, long battery lifetime, reduced modem complexity, coverage enhancement, and reduced user equipment (UE) bandwidth (e.g. 1.4 MHz in downlink) In order to achieve required coverage for low-complexity UE:s and other UE:s operating delay tolerant machine-type communication (MTC) applications, time repetition techniques may be used, which enables energy accumulation of the received signals at the UE side.

Discussions are currently ongoing (e.g. within 3GPP and MFA), regarding the potential to evolve existing unlicensed standards to also support IoT use-cases within unlicensed bands. One issue to consider for such work is the regulatory requirements, which may differ, e.g. depending on frequency band and geographical region. One frequency band that may be eligible for IoT operation is the band in the vicinity of 2.4 GHz. Requirements for the European region are specified within the ETSI harmonized standard for equipment using wideband modulation (ETSI EN 300 328).

ETSI EN 300 328 provisions several adaption requirements for different operation modes. From the top level, equipment can be classified either as frequency hopping or non-frequency hopping, as well as adaptive or non-adaptive. Adaptive equipment is mandated to sense whether the channel is occupied in order to better coexist with other users of the channel. The receiving node will be unaware of the result of the sensing and therefore needs to detect whether any signal is present or not. While such signal detection would most likely be feasible for devices operating at moderate to high SINR levels, they may be infeasible for very low signal-to-interference and noise ratio (SINR) levels (which may be applicable in IoT scenarios). In particular, for systems using repetition schemes to achieve coverage extension, the received SINR of each individual transmission is typically very low. The effective SINR may increase through accumulation of multiple transmissions, but when the accumulation includes both signal and noise (as could be the case when the transmitter uses adaptive mechanisms) the repetition techniques may fail. Thus, an IoT standard for 2.4 GHz in Europe may benefit from avoiding the adaptive approach of equipment classification. Further, non-frequency hopping equipment is subject to requirements on maximum power spectral density (PSD) of 10 dBm/MHz, thus limiting the maximum output power for systems using narrow bandwidths. Thus, an IoT standard for 2.4 GHz in Europe may benefit from avoiding the non-frequency hopping approach of equipment classification.

Requirements for non-adaptive frequency hopping include the following:

- A maximum Tx-sequence-time of 5 ms. Tx-sequence is defined as a period in time during which a single or multiple transmissions may occur and which shall be followed by a Tx-gap.
- A minimum duration of the transmission gap of 5 ms.
- A maximum accumulated transmit time of 15 ms, which is the maximum total transmission time a node may be allowed to use one frequency before moving to the next frequency hop.
- A maximum Output Power of 20 dBm, i.e. 100 mW.
- A maximum Medium Utilization (MU) of 10%, where the medium utilization is defined as, MU=(P/100 mW)*DC, where P is the transmission power (Pout) and DC is the Duty Cycle which in turn is defined as DC=(Transmitter 'on' time)/(Observation Period). Here the Observation Period is defined as the (Average Dwelling time*max (100; 2* number of hopping frequencies)). A dwelling time is the time spent on a frequency before moving to another frequency.

The maximum allowed dwelling time is maximum accumulated transmit time+transmission time gaps between, i.e. 30 ms.

Further analyzing the requirements, it is understood that the Medium Utilization requirement limits the Duty Cycle with a dependency on output power (transmission power). When a device is transmitting at the maximum output power level of 20 dBm, the duty-cycle limitation limits the total Transmitter 'on' time to 10% of the duration of the Observation Period. If the output power is lowered below the maximum output power, the allowed duty-cycle increases in proportion to the decrease in power. The resulting requirement on duty-cycle for different exemplary output powers (given the medium utilization requirement of 10%) is illustrated via a few example values in the following table:

| $P_{out}$ (dBm) | Duty Cycle |
|---|---|
| 20 | 10% |
| 17 | 20% |
| 14 | 40% |
| 11 | 80% |

Therefore, in relation to this kind of scenario (and other relevant scenarios) there is a need for approaches that address the limitation dependency between transmission power level and duty cycle.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to solve or mitigate at least some of the above or other disadvantages.

In that context, it should be noted that the above-described scenario is not to be considered as limiting, but merely as illustrating one situation where embodiments may be applicable. Generally, embodiments may be equally applicable in any situation where two types of wireless communication devices are served by a network node, and the two types have different requirements regarding maximum communication distance range. Specifically, some embodiments address the problem of balancing requirements regarding communication distance range (which implies a corresponding transmission power level) and other requirements such as traffic load, capacity, data rate, latency, etc.

According to some embodiments, an approach is provided where the transmission power (and possibly the transmission bandwidth) of the cell is dynamically adapted. Thereby, system capacity and performance may be optimized (or at least improved compared to some other approaches) in situations where users with different requirements (regarding e.g. coverage, latency, throughput, etc.) are to be served.

A first aspect is a method for a network node of a wireless communication network. The network node is adapted to communicate with wireless communication devices of a first type associated with a first maximum communication distance range and with wireless communication devices of a second type associated with a second maximum communication distance range, the first maximum communication distance range being greater than second maximum communication distance range.

The method comprises acquiring values of a first number and a second number, the numbers representing amounts of wireless communication devices associated with upcoming communication with the network node of the first and second types, respectively.

The method also comprises determining, based on a first condition associated with a ratio between the first number and the second number, a transmission power level for the upcoming communication, wherein a first determined transmission power level based on a first ratio is higher than a second determined transmission power level based on a second ratio if the first ratio is higher than the second ratio, and causing application of the determined transmission power level to the upcoming communication.

According to some embodiments, the acquiring step may be performed in connection with other operations of the network node. For example, a scheduler of the network node may have acquired the first and second number according to any suitable known or future method.

The transmission power level may be related to a maximum communication distance range such that a particular determined transmission power level results in a particular maximum communication distance range that is greater than another maximum communication distance range resulting from another determined transmission power level which is lower than the particular determined transmission power level. The transmission power level is also referred to herein as "output power", "Pout" and simply "power".

The first condition may for example comprise the ratio being compared with a first ratio threshold, and, if the ratio is higher than the first ratio threshold, determining a transmission power level higher than if the ratio is not higher than the first ratio threshold. The first ratio threshold may be static or dynamic. Vice versa, the first condition may for example comprise the ratio being compared with a first ratio threshold, and, if the ratio is lower than the first ratio threshold, determining a transmission power level lower than if the ratio is not lower than the first ratio threshold.

For example, the network node may be an eNodeB compliant with a 3GPP standard. The upcoming communication may be communication in an unlicensed frequency band. For example, the upcoming communication may comply with the ETSI harmonized standard for equipment using wideband modulation and may be defined as non-adaptive frequency hopping communication. The transmission power level may, in some embodiments, be related to a corresponding duty cycle via a medium utilization requirement.

The wireless communicating devices of the first type are also referred to herein as "extended coverage devices" or "extended coverage users" (ECU) and may, for example, be IoT devices. The wireless communicating devices of the second type are also referred to herein as "normal devices" or "normal users" (NU). The NU typically need to support delay sensitive traffic, e.g. Voice over IP (VoIP). The ECU or IoT devices may, for example, be defined via one or more of high maximum communication distance range (coverage requirement), high latency acceptance, low data rate requirement (both peak and average; related to low traffic rate and low bandwidth requirements), low power consumption requirements (related to long battery time), where high/low/etc. are in relation to "normal" devices.

In some embodiments, the method may further comprise determining that a traffic load of the network node is above a traffic load threshold. Then, the steps of acquiring the values, determining the transmission power level, and causing the application are performed in response to the determination that the traffic load of the network node is above the traffic load threshold. The traffic load threshold may be static or dynamic. For example, the traffic load threshold may correspond to a predetermined percentage (e.g. 70%, 80%, 90%, 95% or 99%) of the maximum possible traffic load of the network node.

According to some embodiments, the determined transmission power level may be for application until a second condition associated with the ratio between the first number and the second number is fulfilled. The second condition may for example comprise the ratio being compared with a second ratio threshold, and, if the ratio is lower than the second ratio threshold, determining a transmission power level lower than if the ratio is not lower than the second ratio threshold. The second ratio threshold may be static or dynamic. The second ratio threshold may be equal to the first ratio threshold or they may differ to achieve a hysteresis effect. Vice versa, the second condition may for example comprise the ratio being compared with a second ratio threshold, and, if the ratio is higher than the second ratio threshold, determining a transmission power level higher than if the ratio is not higher than the second ratio threshold.

According to some embodiments, the determined transmission power level may be for application during a predetermined time period.

In some embodiments, wireless communication devices of the first type are not scheduled during time periods (predetermined or controlled by the second condition) when the determined transmission power level is below a transmission power level threshold. The transmission power level threshold may be associated with the first maximum communication distance range such that a transmission power level below the transmission power level threshold results in a maximum communication distance range that is lower than the first maximum communication distance range.

According to some embodiments, the determined transmission power level may be an average transmission power level for application during a time interval comprising a plurality of time periods. Then, application of the determined transmission power level may comprise application of a momentary transmission power level in each time period such that an average value of the momentary transmission power levels substantially equals the determined transmission power level.

The upcoming communication may comprise downlink communication according to some embodiments. Then, causing application of the determined transmission power level may comprise using the determined transmission power level for the downlink communication.

The upcoming communication may comprise uplink communication according to some embodiments. Then, causing application of the determined transmission power level may comprise transmitting a signal indicative of the determined transmission power level to at least one of the wireless communication devices associated with the upcoming communication. The at least one of the wireless communication devices may, for example, be of the second type. According to these embodiments, the method may further comprise receiving, from the at least one wireless communication device, a message indicative of requirements (e.g. latency, data rate, buffer status) of the uplink communication, and the determination of the transmission power level may be further based on the requirements. Additionally, the method may further comprise scheduling the at least one wireless communication device using a duty cycle value associated with the determined transmission power level, wherein a first duty cycle value associated with the first determined transmission power level is lower than a second duty cycle value associated with the second determined transmission power level, the first determined transmission power level being higher than the second determined transmission power level.

In some embodiments, the method may further comprise determining, based on the first condition, a transmission bandwidth for the upcoming communication, wherein a first determined transmission bandwidth based on the first ratio is smaller than a second determined transmission bandwidth based on the second ratio, the first ratio being higher than the second ratio, and causing application of the determined transmission bandwidth to the upcoming communication.

A second aspect is a computer program product comprising a computer readable medium, having thereon a computer program comprising program instructions, the computer program being loadable into a data-processing unit and adapted to cause execution of the method according to the first aspect when the computer program is run by the data-processing unit.

A third aspect is an arrangement or apparatus for a network node of a wireless communication network. The network node is adapted to communicate with wireless communication devices of a first type associated with a first maximum communication distance range and with wireless communication devices of a second type associated with a second maximum communication distance range, the first maximum communication distance range being greater than second maximum communication distance range.

The arrangement comprises a controller adapted to cause acquiring (e.g. by a scheduler associated with or comprised in the arrangement) of values of a first number and a second number, the numbers representing amounts of wireless communication devices associated with upcoming communication with the network node of the first and second types, respectively.

The controller is also adapted to cause determination (e.g. by a determiner associated with or comprised in the arrangement), based on a first condition (e.g. tested by an evaluator associated with or comprised in the arrangement) associated with a ratio between the first number and the second number, of a transmission power level for the upcoming communication, wherein a first determined transmission power level based on a first ratio is higher than a second determined transmission power level based on a second ratio if the first ratio is higher than the second ratio, and application (e.g. by one or more of a transmitter, a scheduler, and a power regulator associated with or comprised in the arrangement) of the determined transmission power level to the upcoming communication.

In some embodiments, the controller may be further adapted to cause determination that a traffic load of the network node is above a traffic load threshold and, in response thereto, performance of acquiring of the values, determination of the transmission power level, and application of the determined transmission level.

According to some embodiments, the determined transmission power level may be for application until a second condition associated with the ratio between the first number and the second number is fulfilled.

According to some embodiments, the determined transmission power level may be for application during a predetermined time period.

According to some embodiments, the determined transmission power level may be an average transmission power level for application during a time interval comprising a plurality of time periods. Then, application of the determined transmission power level may comprise application of a momentary transmission power level in each time period such that an average value of the momentary transmission power levels substantially equals the determined transmission power level.

The upcoming communication may comprise downlink communication according to some embodiments. Then, the controller may be adapted to cause the application of the determined transmission power level by causing use of the determined transmission power level for the downlink communication.

The upcoming communication comprises uplink communication according to some embodiments. Then, the controller may be adapted to cause the application of the determined transmission power level by causing transmission of a signal indicative of the determined transmission power level to at least one of the wireless communication devices associated with the upcoming communication. According to these embodiments, the controller may be further adapted to cause reception, from the at least one wireless communication device, of a message indicative of requirements of the uplink communication, and the determination of the transmission power level may be further based on the requirements. Additionally, the controller may be further adapted to cause scheduling of the at least one wireless communication device using a duty cycle value associated with the determined transmission power level, wherein a first duty cycle value associated with the first determined transmission power level is lower than a second duty cycle value associated with the second determined transmission power level, the first determined transmission power level being higher than the second determined transmission power level.

In some embodiments, the controller may be further adapted to cause determination, based on the first condition, of a transmission bandwidth for the upcoming communication, wherein a first determined transmission bandwidth based on the first ratio is smaller than a second determined transmission bandwidth based on the second ratio, the first ratio being higher than the second ratio, and application of the determined transmission bandwidth to the upcoming communication.

A fourth aspect is a network node comprising the arrangement according to the third aspect.

In some embodiments, any of the above aspects may additionally have features identical with or corresponding to any of the various features as explained above for any of the other aspects.

An advantage of some embodiments is that wireless communication devices associated with different maximum communication distance ranges (e.g. coverage) may be accommodated by the same network node.

Another advantage of some embodiments is that this accommodation may be achieved without unnecessary reduction of latency, data rate or traffic capacity due to use of high transmission power.

By varying the transmission power level based on the relation between the numbers of wireless communication devices associated with different maximum communication distance ranges, a trade-off between coverage and (e.g.) capacity may be achieved according to some embodiments.

Using some embodiments, a mix of users with different requirements (coverage, latency, data rate, etc.) can be served with a single network. The cell can be configured dynamically, e.g. to handle temporary peaks in the demand of low latency and/or high bandwidth traffic. Application of some embodiments may, thus, increase the usefulness of the system and provide lower outage (transmission power) when some types of traffic peaks occur.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where the maximum communication distance range of a network node is varied over time based on the current mixture of wireless communication devices associated with upcoming communication, and possibly also based on their respective traffic requirements. The maximum communication distance range may be varied by varying a transmission power level and, optionally, a transmission bandwidth.

For example, there may be two different transmission power levels and the higher one may be used by default. Then, if there is upcoming traffic associated with wireless communication devices which require e.g. high data rate and/or low latency the lower transmission power level may be temporarily used to accommodate this traffic.

A ratio between the numbers of wireless communication devices of different types may be used to determine which transmission power level is to be used. The ratio may be between the number of wireless communication devices associated with high maximum communication distance range, low data rate and/or high latency and the number of wireless communication devices associated with lower maximum communication distance range, high data rate and/or low latency.

In some embodiments, the use of the lower transmission power level is only applied when there is already a high traffic load in the cell, since if the traffic load of the cell is low the upcoming traffic may be accommodated even if the higher transmission power level is used.

Figure 1A:
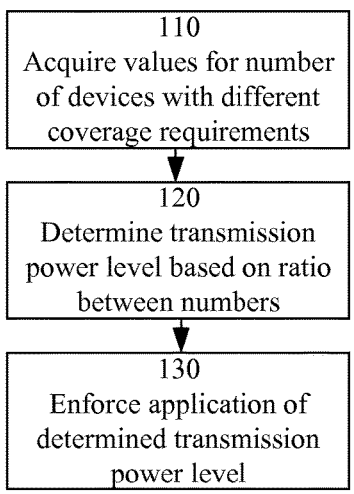
FIG. 1A is a flowchart illustrating example method steps according to some embodiments.

FIG. 1A illustrates an example method 100A according to some embodiments. The method 100A may be performed by a network node of a wireless communication network. The network node may be adapted to communicate with wireless communication devices of a first type associated with a first maximum communication distance range and with wireless communication devices of a second type associated with a second maximum communication distance range, the first maximum communication distance range being greater than second maximum communication distance range. This may be viewed as the different types of wireless communication devices having different coverage requirements.

The method starts in step 110 where values are acquired for the number of wireless communication devices of the different types that are associated with upcoming communication with the network node.

In step 120 a transmission power level is determined based on a ratio between the number of wireless communication devices of the first type and the number of wireless communication devices of the second type. For example, the ratio may be compared to a (static or dynamic) threshold and a high transmission power may be selected if the ratio is higher than the threshold. Numerous other ways to implement the determination based on the ratio may be envisioned. For example, several thresholds and corresponding transmission power levels may be applied, or the transmission power level may be linearly dependent on the ratio.

In step 130, application of the determined transmission power level is enforced to the upcoming communication. The method 100A may be iterated as suitable.

Figure 1B:
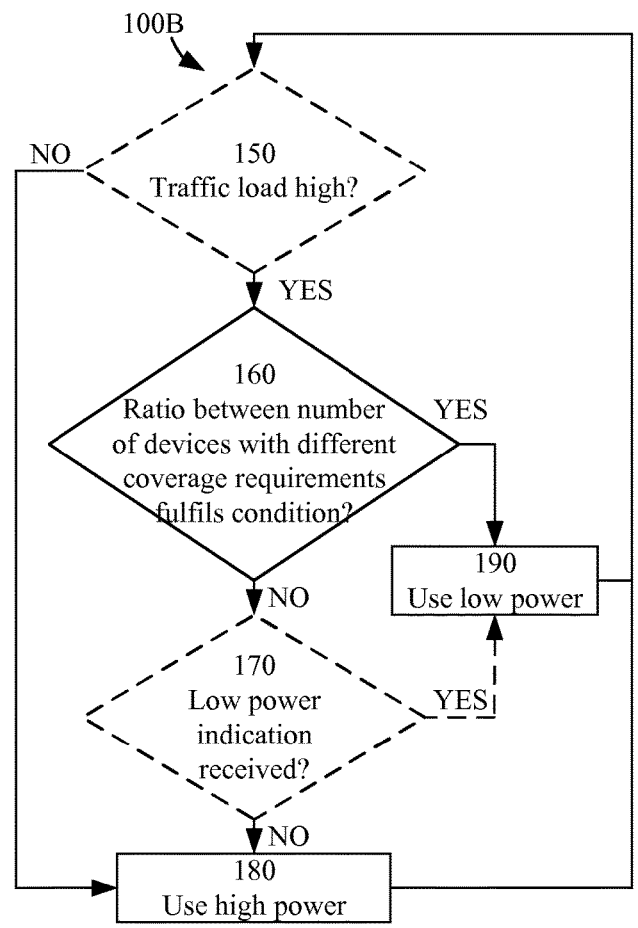
FIG. 1B is a flowchart illustrating example method steps according to some embodiments.

FIG. 1B also illustrates an example method 100B according to some embodiments. The method 100B may be performed by a network node of a wireless communication network in a similar way that was explained in connection to FIG. 1A.

In optional step 150, it is determined whether the traffic load of the cell is high (e.g. by comparison with a suitable threshold). If the traffic load is not high (NO-path out of step 150) a high transmission power may be used (step 180) for all types of wireless communication devices. If the traffic load is high (YES-path out of step 150) the method continues to step 160.

In step 160, the ratio between number of wireless communication devices of different types is evaluated to determine whether it fulfills a condition defining when a low transmission power should be used. For example, the ratio may be compared with a threshold as explained above in connection with step 120 of FIG. 1A, and the condition may be considered fulfilled if the ratio is below the threshold. If the ratio fulfills the condition (YES-path out of step 160) a low transmission power may be used (step 190). If the ratio does not fulfill the condition (NO-path out of step 160) the method continues to step 170.

In optional step 170, it is determined whether an indication has been received that any of the wireless communication devices of the second type require high data rate and/or low latency (or has other requirements that would benefit from using a low transmission power level). If so (YES-path out from step 170) a low transmission power may be used (step 190), and otherwise (NO-path out of step 170) a low transmission power may be used (step 180). The method 100B may be iterated as suitable.

Figure 2:
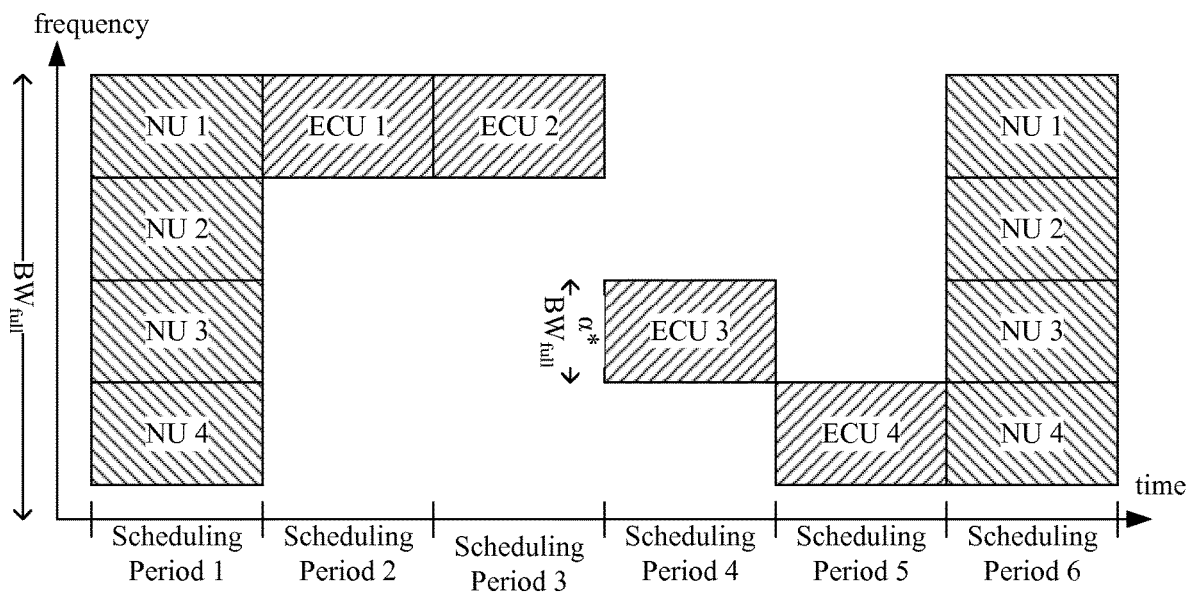
FIG. 2 is a schematic diagram illustrating example time-frequency allocation with varying bandwidth according to some embodiments.

In some embodiments, the bandwidth used for the upcoming communication may also be varied depending on how many wireless communication devices of different types are involved. FIG. 2 illustrates one example of how different bandwidths may be used for different types of devices.

Figure 4:
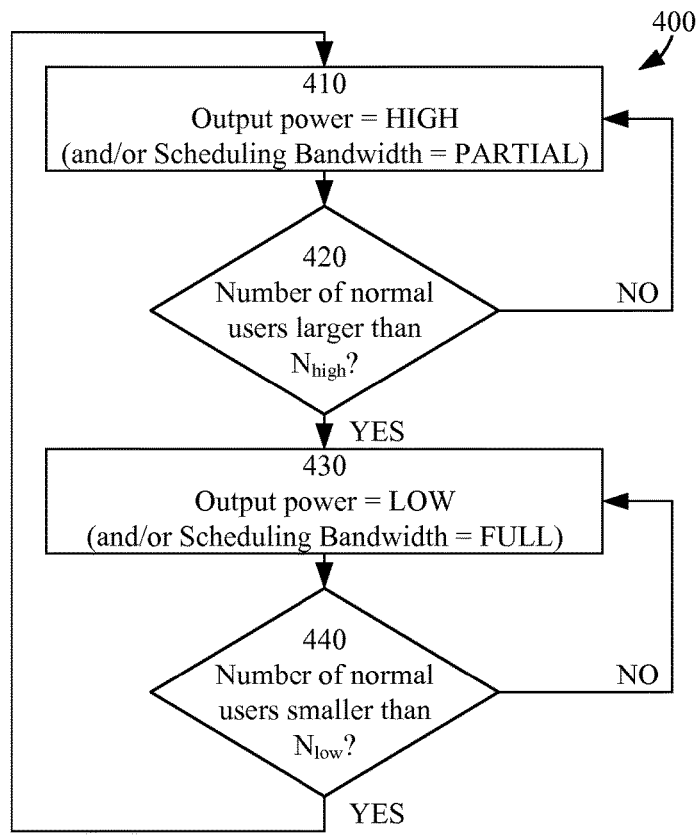
FIG. 4 is a flowchart illustrating example method steps according to some embodiments.
Figure 6:
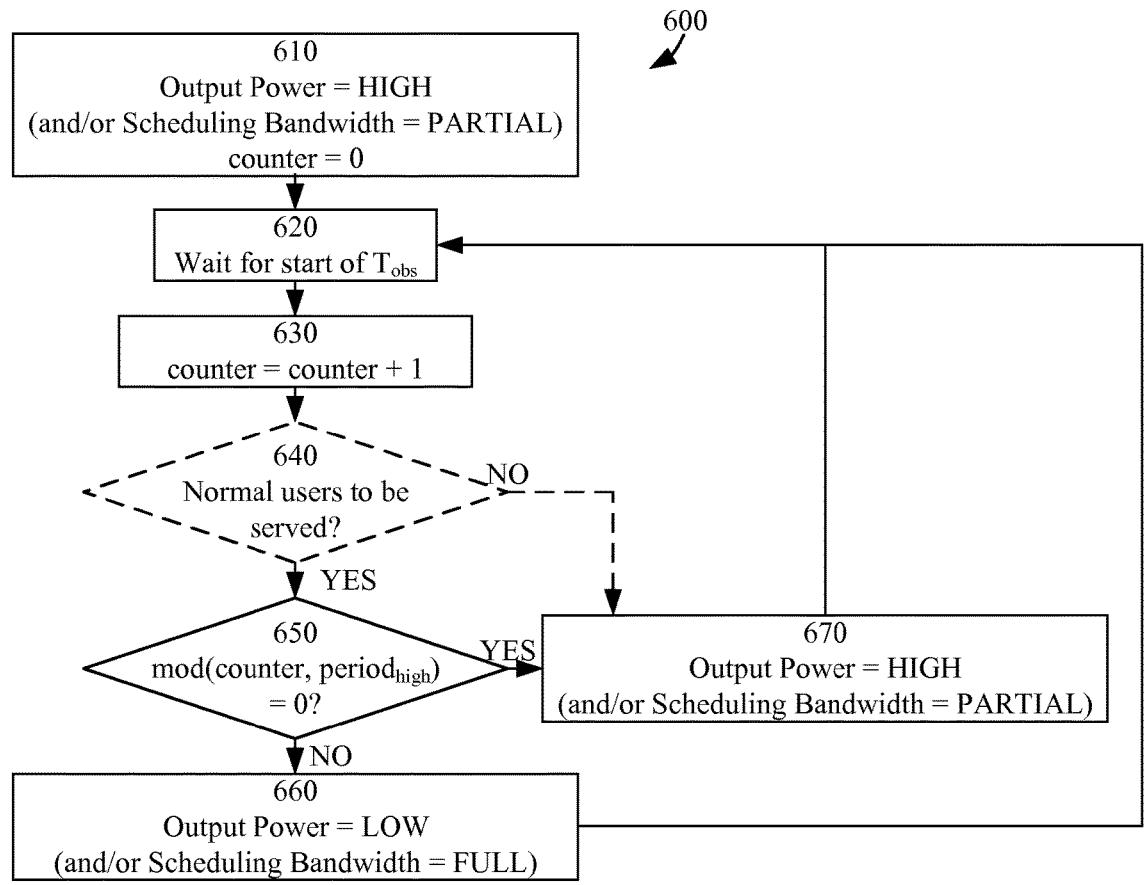
FIG. 6 is a flowchart illustrating example method steps according to some embodiments.

Thus, dynamic adjustment of transmission bandwidth may be applied, e.g. based on the traffic mix (mixture of different types of wireless communication devices) as exemplified in the following. When scheduling normal users (NU), the eNB uses the full bandwidth available per channel, $BW_{full}$. Temporarily, when scheduling extended coverage users (ECU), the eNB may constrain the bandwidth to a fraction, $\alpha$, of $BW_{full}$, and focus its output power in a reduced bandwidth. Examples of this approach are represented in FIGS. 4 and 6 via the optional setting of scheduling bandwidth to FULL ($BW_{full}$) or PARTIAL ($\alpha*BW_{full}$).

For the downlink, the concept can be realized by semi-statically allocating frequency domain resources, of bandwidth $\alpha*BW_{full}$, for different users (see FIG. 2 for an example). Once a user has been semi-statically configured with a frequency domain resource, it monitors the assigned frequency domain resource for scheduling assignments. Extended coverage users may be assumed to always be allocated reduced bandwidth allocations. Normal users may be allocated frequency domain resources according to different approaches. A normal user can be assigned a reduced bandwidth of $\alpha*BW_{full}$. Increased downlink capacity can then be realized by scheduling different users in different frequency domain resources. When scheduling normal users, the network node or eNodeB transmits across the full bandwidth, thus with increased capacity at the cost of less coverage since the power in each narrow bandwidth allocation of $\alpha*BW_{full}$ will be lower than the total transmitted power. Alternatively, a normal user could also be allowed to be scheduled over the full bandwidth, provided that the user supports such a larger bandwidth. Since a device supporting larger bandwidth typically entails a larger device cost, such device capability may need to be indicated to the eNB. Once the eNB knows which users support larger bandwidth, it may choose to semi-statically configure the operating bandwidth of these users with any a fraction of bandwidth ranging from a minimum bandwidth to the full bandwidth i.e. $BW_{min} < BW_{scheduled} < BW_{full}$.

FIG. 2 illustrates an example of scheduling according to dynamic bandwidth adjustment. Scheduling can be done with some arbitrary time-granularity, denoted "Scheduling Period" in FIG. 2. In Scheduling Periods 1 and 6, normal users are scheduled, and the eNB transmits to four users simultaneously. In Scheduling Periods 2 to 5, one extended coverage user is scheduled in each Scheduling Period. During these scheduling periods (2 to 5), the eNB transmits with a reduced bandwidth; in the frequency range that has been semi-statically allocated for each individual user/device.

As can be seen from the example in FIG. 2, the narrow-band scheduling of extended coverage users creates an additional degree of freedom to choose a narrow bandwidth that has beneficial channel and/or interference properties for the individual user.

Figure 3:
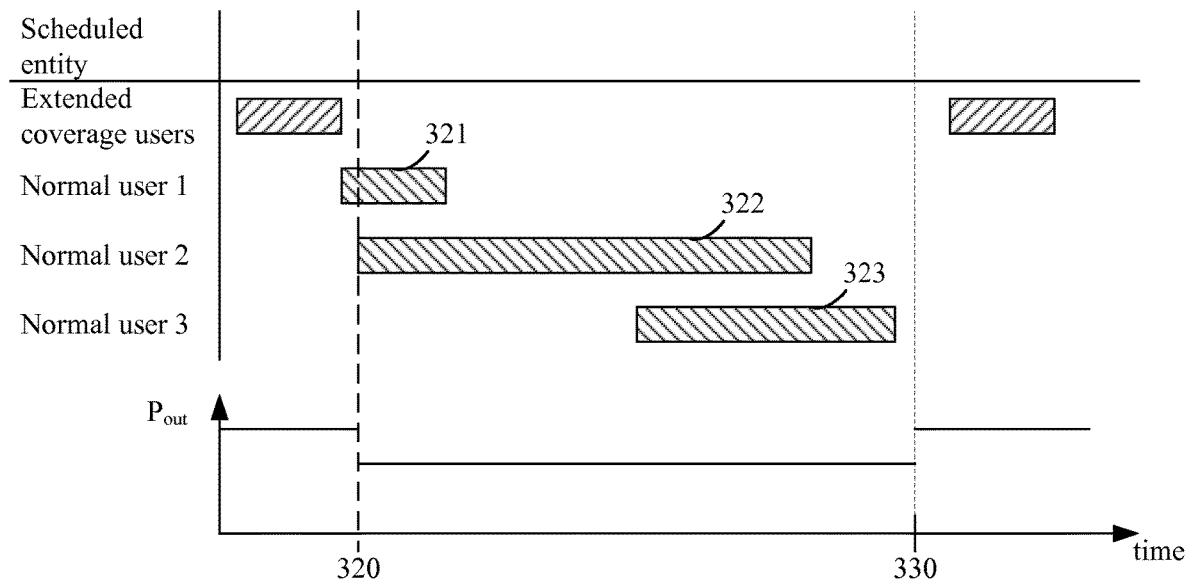
FIG. 3 is a schematic diagram illustrating example transmission power levels and corresponding time allocation according to some embodiments.

In some embodiments, the determined transmission power level is for application until a (second) condition is fulfilled. The second condition is associated with the ratio between the first number and the second number. The determined transmission power level is hence applied until the second condition is fulfilled. FIGS. 3 and 4 exemplify this approach.

To illustrate the exemplification of FIGS. 3 and 4, a situation may be considered where a cell is serving a certain number of IoT devices (extended coverage users) that have less stringent latency requirements and limited DL traffic while requiring deep coverage (high maximum communication distance range). For these users it may be optimal to transmit with as high power as possible. For these users, compliance with possible limitations on duty-cycle is typically a minor issue.

In the situation considered, the same cell supports users or devices (normal users) requiring traffic with higher rates and which is more delay sensitive (e.g. VoIP). Sporadically, such users appear and disappear with some element of randomness. Assuming that the support for normal users is anyway limited to somewhat lower coverage than what is supported for the extended coverage users, the output power for the network node can be lower when only serving those users (with higher duty cycle and lower latency).

As the need to support normal users temporarily increases, the network node (e.g. an eNodeB) may therefore temporarily pause the connection to the extended coverage devices, and lower its output power to focus on serving the normal users. This is illustrated in FIG. 3 by the lowering of its output power Pout at time 320 when both Normal users 1 and 2 require communication (321, 322). Here the ratio of the number of extended coverage users that require communication to the number of normal users that require communication decreases to a level below a first ratio threshold. The lowering of the output power increases the capacity and reduces latency for the normal users because the lower output power increases the duty-cycle allowed in the system.

As the number of normal users decrease, the eNodeB again increases its output power and reestablishes the connection with the extended coverage users. This is illustrated in FIG. 3 by the increase of Pout at time 330 when Normal users 1, 2 and 3 no longer require communication (321, 322, 323). Here the ratio of the number of extended coverage users that require communication to the number of normal users that require communication increases to a level above a second ratio threshold.

Since the latency requirement for the extended coverage users is less of an issue, the pause in the connection may be accepted. For example (depending on the use-case), it may be reasonable to assume that many of the extended coverage devices are expected to operate in DRX mode where the time in between being reachable may be several minutes or even days.

An example method 400 applicable to the scenario of FIG. 3 is illustrated in FIG. 4. Thus, according to the example of FIG. 3 the output power of the eNodeB (Pout) is normally high (see also step 410 of FIG. 4) in order to provide coverage for extended coverage users. At time 320, the number of normal users (e.g. VoIP users) increases to two (see also step 420 of FIG. 4), triggering the eNodeB to lower its output power (see also step 430 of FIG. 4) to increase capacity while sacrificing coverage. During the time-period between 320 and 330, extended coverage users may be temporarily unreachable, which may be acceptable since the traffic may be delay tolerant. As the last normal user connection 323 ends (see also step 440 of FIG. 4) the eNodeB is triggered to increase, at time 330, the output power (see also step 410 of FIG. 4) and resume scheduling extended coverage users.

Step 420 of FIG. 4 may be seen as a way to implement the evaluation of the first condition associated with the ratio between the first number and the second number and step 440 of FIG. 4 may be seen as a way to implement the evaluation of the second condition associated with the ratio (compare also with step 120 of FIG. 1A and step 160 of FIG. 1B). In FIG. 4, the thresholds $N_{high}$ and $N_{low}$ are used to control the triggering of power change. If these thresholds, for example, correspond to scaled versions of the number of extended coverage users, steps 420 and 440 is completely analogous to comparing the ratio with thresholds corresponding to the scaling parameters.

Figure 5:
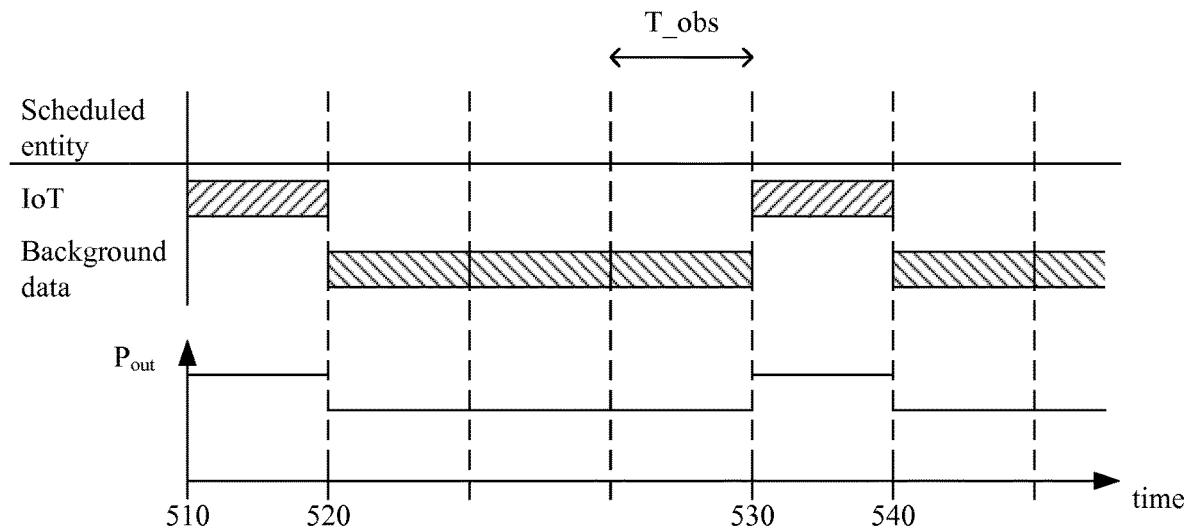
FIG. 5 is a schematic diagram illustrating example transmission power levels and corresponding time allocation according to some embodiments.

According to some embodiments, the determined transmission power level is an average transmission power level for application during a time interval comprising a plurality of time periods. Hence, the determined transmission power level is applied during the time period. In such embodiments, application of the determined transmission power level may comprise application of a momentary transmission power level in each time period such that an average value of the momentary transmission power levels substantially equals the determined transmission power level. FIGS. 5 and 6 exemplify this approach.

According to the example in FIG. 5, the network node or cell output power (Pout) is dynamically adapted in a case when certain normal users require background traffic with large amounts of data (background data) with some delay tolerance at positions of relatively good coverage (relatively low maximum communication distance range requirements). Assuming for this example that the extended coverage users (e.g. IoT devices) are still to be served, the network node (e.g. eNodeB) could devise a planned schedule for the output power so as to serve the extended coverage users in a timely manner, while using lower power to utilize a higher duty-cycle when serving the normal users. An example of such a schedule is shown in FIG. 5, where a high output power is applied in the time intervals 510-520 and 530-540 to serve extended coverage users (e.g. IoT devices) and a low output power is applied in the time intervals 520-530 and after 540 to serve devices or users requiring background data (normal users). The scheduling may, for example, be done in a way that satisfies the regulatory requirements such that each scheduling period (time period between each pair of dashed lines in FIG. 5, $T_{obs}$) represents one medium utilization observation period as specified in ETSI EN 300 328. Thus, FIG. 5 illustrates an example of using embodiments for a scenario with a mix of traffic consisting of extended coverage users requiring deep coverage and normal users with background data requiring less coverage. As can be seen, the network node output power can be adjusted based on the scheduling of users requiring normal coverage and users requiring extended coverage.

An example method 600 for a network node applicable to the scenario of FIG. 5 is illustrated in FIG. 6. The method starts with a counter value is reset (e.g. to zero) in step 610 where a high output power is used to serve extended coverage users (compare with the time 510-520 of FIG. 5). When a new time period (e.g. an observation period, $T_{obs}$) starts in step 620, the counter value is increased by one in step 630 and it may, optionally, be checked whether there are normal users to be served in step 640. If not (NO-path out of step 640) the output power is set to (or kept at) a high level (step 670). Otherwise (YES-path out of step 640) the method continues to step 650, where it is determined whether the counter value is dividable by a periodicity of the pattern regulating the momentary power level (compare with the number of time periods between 510 and 530 of FIG. 5). If so (YES-path out of step 650) the output power is set to a high level (step 670). Otherwise (NO-path out of step 650) the output power is set to a low level (step 660). After steps 660 and 670, the method returns to step 620. Optionally, the counter may be reset to zero in step 670.

A power variation pattern as that illustrated by FIGS. 5 and 6 may be seen as application of an average transmission power level (that is lower than the power level used for extended coverage) during a time interval comprising a plurality of time periods (scheduling periods). The time interval during which this power variation pattern is applied may start and end using similar conditions associated with a ratio between numbers of devices of different types as explained above and exemplified in connection with FIGS. 3 and 4. In some embodiments, a test like that in step 640 may serve as the second condition and the NO-path may lead to ending the pattern application and applying the high output power continuously.

Thus, FIG. 6 illustrates an example flow chart for adapting output power based on a planned scheduling for serving devices/users with different coverage requirements. Normal users with background data to transmit/receive are assumed to have less stringent coverage requirements. The variable $period_{high}$ represents the periodicity, for which extended coverage users are to be scheduled. Extended coverage users are assumed to have more stringent coverage requirements and thus require higher output power.

A further example of when the network node may benefit from adapting the output power is a case where many normal users need to be served simultaneously (for example newly deployed users are powered on at the same time and requesting connections and services from the eNB). For such a case the eNB:s duty cycle constraints may be a bottleneck for scheduling DL and UL transmission for all the users. The eNB may determine to lower its output power temporarily in order to increase the duty cycle and capacity, and minimize impact to existing users and/or new users.

Figure 7:
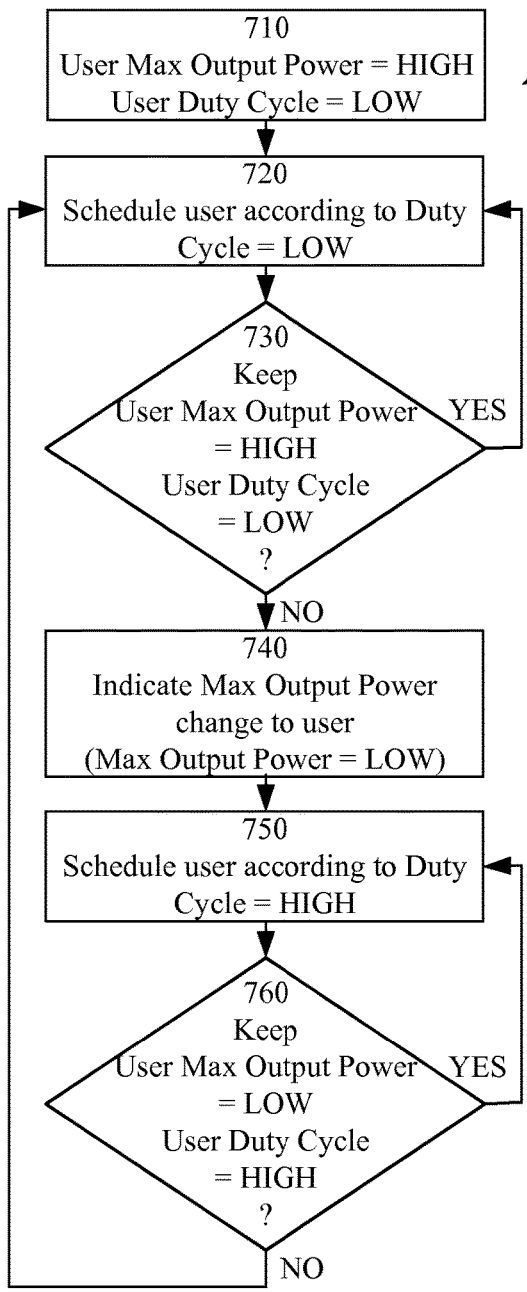
FIG. 7 is a flowchart illustrating example method steps according to some embodiments.

FIG. 7 illustrates, according to further embodiments, a flowchart of an example method 700 for a network node adjusting maximum output power and correspondingly adjusting the duty cycle of another node (typically a wireless communication device). This is an example of how the network node may cause application of or applying the determined transmission power level to uplink communication.

The method starts in step 710 where a high maximum output power and a low user duty cycle is applied for a particular user/device, and the user is scheduled in the UL according to the low duty cycle in step 720. In step 730 it is determined whether to modify the maximum output power (from high to low) and, correspondingly, the user duty cycle (from low to high). If the current setting is to be kept (YES-path out of step 730) the method returns to step 720, otherwise (NO-path out of step 730) the method continues to step 740. In step 740, the network node indicates the change of the maximum output power (from high to low) to the user via suitable signaling, and the user is scheduled in the UL according to the high duty cycle in step 750. In step 760 it is determined whether to modify the maximum output power (from low to high) and, correspondingly, the user duty cycle (from high to low). If the current setting is to be kept (YES-path out of step 760) the method returns to step 750. Otherwise (NO-path out of step 760) the method returns to step 720, possibly after the network node having indicated the change of the maximum output power (from low to high) to the user via suitable signaling.

The network node (e.g. eNB) may determine (compare with step 730, 760) that certain users may need an increased duty cycle for transmitting UL data (for example, UL transmissions of a VoIP user are as delay sensitive as its DL transmissions). The eNB may configure a lower maximum transmission power for the user and schedule the transmissions of the user with a corresponding maximum duty cycle to satisfy the performance needs of the user. These embodiments may, thus, involve determining the required combination of maximum output power and duty cycle for a certain user and indicating the determined maximum output power to the user via suitable signaling as illustrated by the example of FIG. 7.

The determination by the network node (compare with step 730, 760) to enforce lower transmission power in the uplink may be autonomous or may be based on information from one or more of the users. As an example of the latter, the user may determine that it would be beneficial to lower its output power and increase its duty cycle (e.g. to transmit with a higher data rate and/or to transmit delay sensitive data). Since users are scheduled by eNB, the user can indicate this need to the eNB (e.g. that an increased duty cycle is needed). This indication may, for example, comprise a buffer status report indicating the amount of data to be transmitted or a desired duty cycle value and duration. Upon receiving such indication from a user, the eNB may determine whether to increase or decrease the maximum duty cycle for the user. Based on the determined duty cycle change, the eNB may signal a modified maximum transmission power for the user and schedule the user for UL communication considering the maximum duty cycle. The determination by the eNB in steps 730 and 760 of whether or not to modify the output power, may, thus, be based on a request for modification of the duty-cycle of a user received from the user itself.

Figure 8:
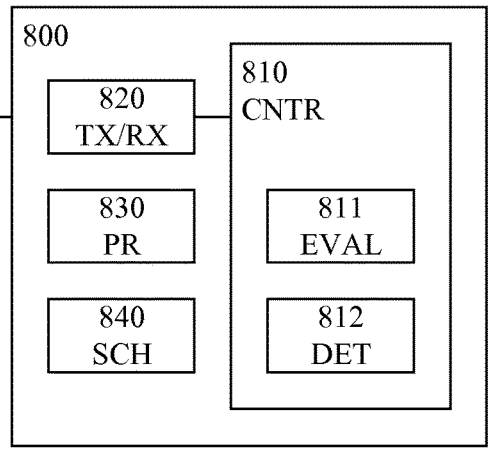
FIG. 8 is a schematic block diagram illustrating an example arrangement or apparatus according to some embodiments.

FIG. 8 illustrates an example arrangement or apparatus 800 for a network node. The network node may be as described earlier herein, e.g. in connection to FIG. 1A. The arrangement 800 may, for example, be adapted to perform (or cause performance of) any of the methods described in connection to FIGS. 1A, 1B, 4, 6 and 7.

The arrangement 800 comprises a controller (CNTR) 810. The arrangement may further comprise (or be associated with) one or more of a transceiver (TX/RX) 820, a power regulator (PR) 830, a scheduler (SCH) 840, a determiner (DET) 812 and an evaluator (EVAL) 811, each of which may or may not be comprised in the controller 810.

A network node of a wireless communication network comprising the arrangement 800 may be adapted to communicate with wireless communication devices of a first type associated with a first maximum communication distance range and with wireless communication devices of a second type associated with a second maximum communication distance range, the first maximum communication distance range being greater than second maximum communication distance range.

The controller 810 may be adapted to cause acquiring of values of a first number and a second number, the numbers representing amounts of wireless communication devices associated with upcoming communication with the network node of the first and second types, respectively.

The controller 810 may also be adapted to cause determination, based on a first condition associated with a ratio between the first number and the second number, of a transmission power level for the upcoming communication, wherein a first determined transmission power level based on a first ratio is higher than a second determined transmission power level based on a second ratio if the first ratio is higher than the second ratio.

The controller 810 may be also adapted to cause application of the determined transmission power level to the upcoming communication.

Some embodiments provide an approach for traffic dependent range adjustment via dynamic adjustment of maximum output power.

An example scenario where embodiments may be applicable is where regulatory requirements for 2.4 GHz operation in Europe require equipment operating with non-adaptive frequency hopping to comply with requirements on medium utilization (MU). The medium utilization requirement translates to a maximum duty cycle depending on output power as shown earlier herein. When deploying a network using a potential new standard that complies with the MU requirement, output power may therefore be selected to find the best trade-off between e.g. coverage, traffic load, traffic type (e.g. delay sensitive or delay tolerant) and the balance between expected UL vs. DL traffic. Since the aforementioned parameters are likely to vary with time, there will be certain periods of time for which the selected output power may be suboptimal, thus entailing that the full potential of the system is not utilized.

Using an approach where the output power and/or transmission bandwidth of the cell is dynamically adapted, the system capacity and performance can be optimized (or at least improved compared to other approaches) to serve users with different requirements (e.g. coverage, latency, throughput, etc.) in an efficient way.

According to some embodiments, the output power may be adjusted depending on the amount and type of traffic that is upcoming. Examples of variables that may be considered as part of this process are:
Delay tolerance for the traffic at hand
Coverage requirement for the involved users to be scheduled
Total amount of pending traffic of each type of traffic i.e. load
Number of active devices to be scheduled
   Number of active users requiring low latency
   Number of active users requiring large coverage
Known traffic pattern/schedule of users Some embodiments relate to a method implemented in a network node for controlling the output power (and possibly the transmission bandwidth) of the network node, the method comprising:
Determining the need to serve low latency and/or high data rate users not requiring extended coverage;
Determining the need to temporarily increase the cell capacity and serve more users not requiring extended coverage;
Adjusting the output power (and possibly the transmission bandwidth) by:
   Lowering the output power and increasing the duty cycle (and possibly increasing the transmission bandwidth); or
   Increasing the output power and decreasing the duty cycle (and possibly decreasing the transmission bandwidth).

In some embodiments, the method comprises indicating to a wireless communication device that its output power needs to be adjusted. This may be as a result of receiving an indication of a need for power adjustment or based on an autonomous decision.

In some embodiments, the method comprises increasing the duty cycle of a wireless communication device. This may be as a result of receiving an indication of a need for power adjustment or based on an autonomous decision.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a network node) comprising arrangements/circuitry/logic or performing methods according to any of the embodiments.

Figure 9:
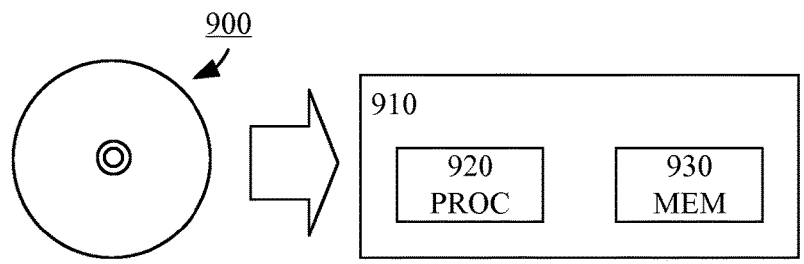
FIG. 9 is a schematic drawing illustrating a computer readable medium according to some embodiments.

According to some embodiments, a computer program product comprises a computer readable medium such as, for example, a USB-stick, a plug-in card, an embedded drive, or a read-only memory (ROM) such as the CD-ROM 900 illustrated in FIG. 9. The computer readable medium may have stored thereupon a computer program comprising program instructions. The computer program may be loadable into a data-processing unit (PROC) 920, which may, for example, be comprised in a network node 910. When loaded into the data-processing unit, the computer program may be stored in a memory (MEM) 930 associated with or integral to the data-processing unit. According to some embodiments, the computer program may, when loaded into and run by the data-processing unit, cause execution of method steps according to, for example, the methods shown in any of the FIGS. 1A, 1B, 4, 6 and 7.

Reference has been made herein to various embodiments. However, a person skilled in the art would recognize numerous variations to the described embodiments that would still fall within the scope of the embodiments. For example, the method embodiments described herein describes example methods through method steps being performed in a certain order. However, it is recognized that these sequences of events may take place in another order without departing from the scope of the embodiments. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the embodiments.

Hence, it should be understood that the details of the described embodiments are merely for illustrative purpose and by no means limiting.

The invention claimed is:

1. A method for a network node of a wireless communication network, the network node adapted to communicate with wireless communication devices of a first type associated with a first maximum communication distance range and with wireless communication devices of a second type associated with a second maximum communication distance range, the first maximum communication distance range being greater than second maximum communication distance range, the method comprising:
   acquiring values of a first number and a second number, the numbers representing amounts of wireless communication devices associated with upcoming communication with the network node of the first and second types, respectively;
   determining, based on a first condition associated with a ratio between the first number and the second number, a transmission power level for the upcoming communication, wherein a first determined transmission power level based on a first ratio is higher than a second determined transmission power level based on a second ratio if the first ratio is higher than the second ratio; and causing application of the determined transmission power level to the upcoming communication.

2. The method of claim 1 further comprising determining that a traffic load of the network node is above a traffic load threshold and wherein the steps of acquiring the values, determining the transmission power level, and causing the application are performed in response to the determination that the traffic load of the network node is above the traffic load threshold.

3. The method of claim 1 wherein the determined transmission power level is for application until a second condition associated with the ratio between the first number and the second number is fulfilled.

4. The method of claim 1 wherein the determined transmission power level is for application during a predetermined time period.

5. The method of claim 1 wherein the determined transmission power level is an average transmission power level for application during a time interval comprising a plurality of time periods, and wherein application of the determined transmission power level comprises application of a momentary transmission power level in each time period such that an average value of the momentary transmission power levels substantially equals the determined transmission power level.

6. The method of claim 1 wherein the upcoming communication comprises downlink communication, and wherein causing application of the determined transmission power level comprises using the determined transmission power level for the downlink communication.

7. The method of claim 1 wherein the upcoming communication comprises uplink communication, and wherein causing application of the determined transmission power level comprises transmitting a signal indicative of the determined transmission power level to at least one of the wireless communication devices associated with the upcoming communication.

8. The method of claim 6 further comprising scheduling the at least one wireless communication device using a duty cycle value associated with the determined transmission power level, wherein a first duty cycle value associated with the first determined transmission power level is lower than a second duty cycle value associated with the second determined transmission power level, the first determined transmission power level being higher than the second determined transmission power level.

9. The method of claim 7 further comprising receiving, from the at least one wireless communication device, a message indicative of requirements of the uplink communication, and wherein the determination of the transmission power level is further based on the requirements.

10. The method of claim 1 further comprising:
determining, based on the first condition, a transmission bandwidth for the upcoming communication, wherein a first determined transmission bandwidth based on the first ratio is smaller than a second determined transmission bandwidth based on the second ratio, the first ratio being higher than the second ratio; and
causing application of the determined transmission bandwidth to the upcoming communication.

11. An arrangement for a network node of a wireless communication network, the network node adapted to communicate with wireless communication devices of a first type associated with a first maximum communication distance range and with wireless communication devices of a second type associated with a second maximum communication distance range, the first maximum communication distance range being greater than second maximum communication distance range, the arrangement comprising a controller adapted to cause:
acquiring of values of a first number and a second number, the numbers representing amounts of wireless communication devices associated with upcoming communication with the network node of the first and second types, respectively;
determination, based on a first condition associated with a ratio between the first number and the second number, of a transmission power level for the upcoming communication, wherein a first determined transmission power level based on a first ratio is higher than a second determined transmission power level based on a second ratio if the first ratio is higher than the second ratio; and
application of the determined transmission power level to the upcoming communication.

12. The arrangement of claim 11 wherein the controller is further adapted to cause determination that a traffic load of the network node is above a traffic load threshold and, in response thereto, performance of acquiring of the values, determination of the transmission power level, and application of the determined transmission level.

13. The arrangement of claim 11 wherein the determined transmission power level is for application until a second condition associated with the ratio between the first number and the second number is fulfilled.

14. The arrangement of claim 11 wherein the determined transmission power level is for application during a predetermined time period.

15. The arrangement of claim 11 wherein the determined transmission power level is an average transmission power level for application during a time interval comprising a plurality of time periods, and wherein the controller is adapted to cause the application of the determined transmission power level by causing application of a momentary transmission power level in each time period such that an average value of the momentary transmission power levels substantially equals the determined transmission power level.

16. The arrangement of claim 11 wherein the upcoming communication comprises downlink communication, and wherein the controller is adapted to cause the application of the determined transmission power level by causing use of the determined transmission power level for the downlink communication.

17. The arrangement of claim 11 wherein the upcoming communication comprises uplink communication, and wherein the controller is adapted to cause the application of the determined transmission power level by causing transmission of a signal indicative of the determined transmission power level to at least one of the wireless communication devices associated with the upcoming communication.

18. The arrangement of claim 16 wherein the controller is further adapted to cause scheduling of the at least one wireless communication device using a duty cycle value associated with the determined transmission power level, wherein a first duty cycle value associated with the first determined transmission power level is lower than a second duty cycle value associated with the second determined transmission power level, the first determined transmission power level being higher than the second determined transmission power level.

19. The arrangement of claim 17 wherein the controller is further adapted to cause reception, from the at least one wireless communication device, of a message indicative of requirements of the uplink communication, and wherein the controller is adapted to cause the determination of the transmission power level further based on the requirements.

20. The arrangement of claim 11 wherein the controller is further adapted to cause:
- determination, based on the first condition, of a transmission bandwidth for the upcoming communication, wherein a first determined transmission bandwidth based on the first ratio is smaller than a second determined transmission bandwidth based on the second ratio, the first ratio being higher than the second ratio; and
- application of the determined transmission bandwidth to the upcoming communication.

\* \* \* \* \*